United States Patent [19]

Sansone et al.

[11] Patent Number: 4,947,333

[45] Date of Patent: Aug. 7, 1990

[54] BATCH MAILING SYSTEM

[75] Inventors: Ronald P. Sansone, Weston; Richard A. Connell, Wilton, both of Conn.; Patricia Corsetti, Pelham, N.Y.; Donald T. Dolan, Ridgefield; George G. Gelfer, West Redding, both of Conn.

[73] Assignee: Pitney Bowes Inc., Stamford, Conn.

[21] Appl. No.: 436,941

[22] Filed: Nov. 14, 1989

Related U.S. Application Data

[63] Continuation of Ser. No. 849,622, Apr. 9, 1986, abandoned, which is a continuation of Ser. No. 813,445, Dec. 26, 1985, abandoned.

[51] Int. Cl.[5] .................... G06F 15/20

[52] U.S. Cl. .................... 364/464.02; 364/464.03

[58] Field of Search .................... 364/464.02, 464.03, 364/146, 900; 235/375, 382; 209/900; 283/71

[56] References Cited

U.S. PATENT DOCUMENTS

| | | | |
|---|---|---|---|
| 710,997 | 10/1902 | Pitney | 101/93 R |
| 3,832,946 | 9/1974 | Lupkas | 101/93 R |
| 3,869,986 | 3/1975 | Hubbard | 101/93 R |
| 4,097,923 | 6/1978 | Eckert et al. | 364/900 |
| 4,122,532 | 10/1978 | Dlugos | 364/466 |
| 4,168,533 | 9/1979 | Schwartz | 364/900 |
| 4,317,030 | 2/1982 | Berghell | 283/71 |
| 4,319,328 | 3/1982 | Eggert | 364/466 |
| 4,388,994 | 6/1983 | Suda et al. | 209/900 |
| 4,408,181 | 10/1983 | Nakayama | 235/375 |
| 4,466,079 | 8/1984 | Daniels et al. | 364/466 |
| 4,507,739 | 3/1985 | Haruki et al. | 209/900 |
| 4,511,793 | 4/1985 | Racanelli | 235/375 |
| 4,568,072 | 2/1986 | Piotroski | 364/146 |
| 4,639,873 | 1/1987 | Baggarly et al. | 364/466 |
| 4,715,622 | 12/1987 | Mikhail | 209/900 |
| 4,734,865 | 3/1988 | Scullion et al. | 364/478 |

*Primary Examiner*—Parshotam S. Lall
*Assistant Examiner*—Ellis B. Ramirez
*Attorney, Agent, or Firm*—Donald P. Walker; Melvin J. Scolnick; David E. Pitchenik

[57] ABSTRACT

A system for processing batch mail in which the need for on-site inspection is unnecessary. The mail sender purchases postage from a central station thereby authorizing him to send mail equal to the amount of postage purchased. The mail sender processes batches of mail each of which is accompanied by a statement summarizing the type and number of mail pieces sent and amount of postage for each batch. The statement contains data that allows mail payment verification.

25 Claims, 7 Drawing Sheets

BATCH MAILING SYSTEM

RELATED CASES

This application is a continuation of application Ser. No. 849,622, filed Apr. 9, 1986, now abandoned, which is a continuation-in-part application of copending application having Ser. No. 813,445 filed Dec. 26, 1985, now abandoned. Subject matter similar to the subject matter contained in the instant application may be found in U.S. patent application entitled "POSTAGE AND MAILING INFORMATION APPLYING SYSTEM" by Ronald Sansone and et al, filed Aug. 6, 1985, having Ser. No. 762,994 and assigned to the assignee of the instant application.

BACKGROUND OF THE INVENTION

Certain organizations dispatch large amounts of mail usually on a periodic basis. Examples of such organizations are: banking institutions, utility companies, insurance companies, credit companies, and the like. With such large quantities, these mail senders normally prepackage and pre-sort their mail and are given a lower postage rate by the postal service because of the time saved by the postal service. There are generally two ways in which such mail send apply postage to their mail. The most common way is by use of a postage meter which is leased by the mail sender a postage meter manufacturer with which the amount of postage required is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each occasion and the postage required.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail sender on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to frequently send a representative to the various mail sender locations to ensure that the mail sender is accurately accounting for the quantity of mail being sent. Such a scheme is not totally reliable as it relies upon on-site verification using the mailers records which are not secure.

SUMMARY AND OBJECTS OF THE INVENTION

A system has been conceived whereby a mailer sender will be able to send large quantities or batches of mail without the need of on-site inspections. This is accomplished by the mail sender having a secure accounting unit similar to a postage meter in which postage value is placed by a dispensing, or central, station. A statement accompanies each batch of mail which statement contains information rllative to the mail and the amount of postage required. Communication between the central station and the mail sender allows postage value to be transferred to the mail sender by the central station and mailing and verification data to be sent to the central station from the mail sender. The mailing and verification data will be the same as that contained on the mailing statements that accompany the batches of mail. This system provides a central station for a large number of mail senders whereby the postal service is relieved of its obligation of having onsite inspections and the central station acts as a clearing house for the postal service through whom verification of postage can be conveniently and inexpensively achieved.

Another feature of the instant invention is that a unique serial number may be provided to the user to be stored in permanent memory to identify the user's accounting unit.

A further feature of this invention is that the security features of a postage meter are provided while allowing a high speed, relatively inexpensive printer to be used for printing the mail pieces.

DETAILED DESCRIPTION OF THE PREFERRED EMBODIMENT

Figure 1:
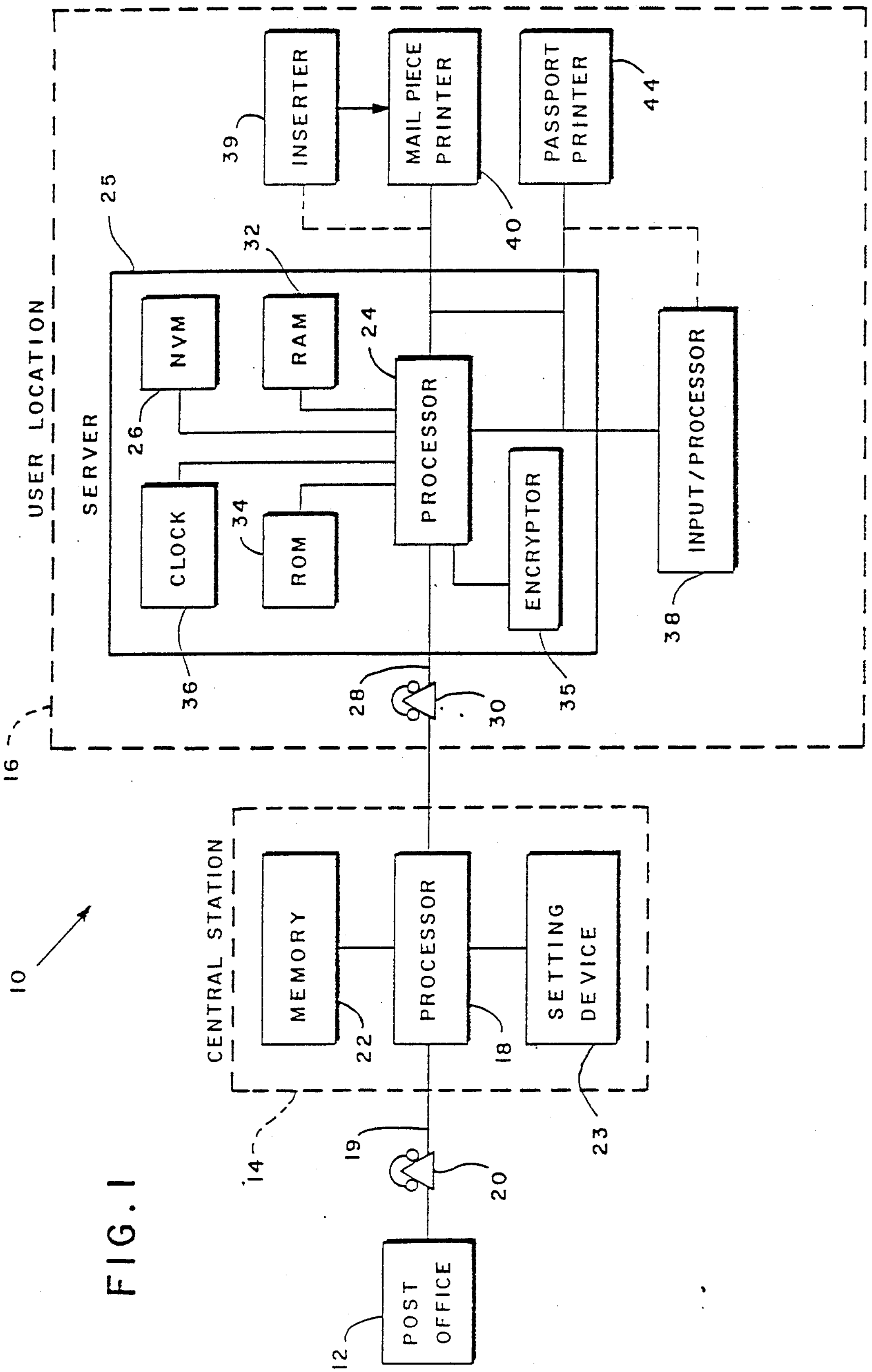
FIG. 1 is a block diagram of a batch mailing system.

Referring now to FIG. 1, a batch mailing system is shown generally at 10 and includes a post office 12, a central station 14 and a user location 16. The central station 14 has a processor 18. This processor 18 could be a main frame type of computer having substantial capacity. Communication is provided between the post office 12 and a plurality of central stations 14 (only one being shown) through a line or communication link 19 having a communication device such as a telephone 20 therein. Associated with the processor 18 and in connection therewith is a large storage memory unit 22 where large amounts of data can be stored and a register setting device 23 which includes encryption software of the type required in the resetting of postage meters remotely. Systems for the resetting of meters remotely are well known, see for example U.S. Pat. Nos. 3,792,446, 4,097,923 and 4,447,890.

A remote user location 16 has a secure unit 25 which will hereafter be referred to as a "server". The server 25 is supplied by the central station 14 to the user and includes a processor 24 which may be a processor of much smaller capacity such as an Intel 8085 processor available from Intel Corporation, Santa Clara, Calif. Connected to the processor 24 is a memory 26. Preferably the memory 26 will be a non-volatile memory (NVM). The processor 24 is connected to the central station processor 18 through a communication link or line 28. A telephone 30 or other communicating device may be disposed within the line 28 to thereby provide selective communication between the processors 18, 24. Also connected to the processor 24 are a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor 24 for the purpose of providing data required in the processing of mail pieces. The input/processor 38 may be any of a large number of personal computers having keyboard and display which are commercially available, such as an IBM XT personal computer.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices, etc., which are of a size to be received within an envelope or the like. High speed inserters of this type are readily available commercially, as for example Inserter model No. 3100 series from Pitney Bowes Inc., Stamford, Conn.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processor 24 or through the input/processor 38. A second printer 44 is provided to print upon a statement sheet 46 or other document. This second printer 44 is preferably a secure printer that is provided by the central station 14. By secured is meant a device constructed in the same manner as a postage meter without access to the interiors thereof except by authorized personnel. An example of such a postage meter is a Model 6500 postage meter available from Pitney Bowes Inc., supra. Obviously, the second printer 44 can be an unsecured printer but this occasions greater risk in terms of verifying payment of mail. Throughout the balance of the specification and claims this statement sheet 46 will be referred to as a "passport". Details of the passport 46 will be described hereinafter in conjunction with FIG. 2.

Although only one user location 16 is shown and described, it will be appreciated many user locations can be serviced by each central station 14 as for example through multiplexing. The central station 14 may be the location of a postage meter manufacturer or other accountable organization.

In operation, the user at the user location 16 will be a sender of large quantities of mail who will be given an identification number by the central station 14 that will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server has many characteristics of a postage meter, i.e., security, a descending register and the like, but certain elements are absent. The most evident absent element is a printer, the advantage of which is described throughout. Another absent member is an ascending register. In a postage meter an ascending register is accessible only by a service representative of the meter manufacturer and may be used to determine if any meter tampering has taken place. As will be appreciated from the description that follows, the need for an ascending register in the server 25 is obviated. Following installation of the identification number, the user will communicate with the central station 14 through the telephone 30 for the purpose of indicating to the central station 14 the amount of postage value it wishes to have accredited to its memory 26. An access code will be given to the user that can be addressed to the setting device 23 through the touch dial of the telephone 30. Upon the receipt of the access code, the user will transmit to the central station 14 the access code and his identification number and the request for an amount of postage value. The setting device 23 will function to charge, or increase, the postage value into the memory 26. This memory 26 will include a descending register which is charged by the central station 14 with the selected amount of postage value. As the user location 16 processes mail, the postage value in the descending register will be decreased in accordance with the postage required to process the mail pieces 34. Devices for charging registers such as the descending registers are well known, as for example see U.S. Pat. Nos. 3,792,446, 4,097,923 and 4,447,890.

The balance of the server 25 includes the ROM 34 that contains information which formats memory address signals and stores a series of programs for controlling the functions of the server 25, a RAM 32 that will hold and supply real time data, a clock 36 that will provide the time and date and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, inexpensive, unsecured printer such as a ink jet printer or laser printer or any type of dot matrix printer which will apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned, to the user location 16 by the central station 14 everytime postage value is added to the server 25 and will be stored in the NVM 26. This transaction number will be the same for one or more batches of mail that are sent and will remain the same until such time as the descending register of the NVM 26 is recharged with postage value, at which time a new transaction number will be assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identified particular segments of the batch.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print the appropriate postage, time, date, transaction number and address on the mail pieces 42 for a particular run. This run will be given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print authorization information upon a passport 46.

Figure 2:
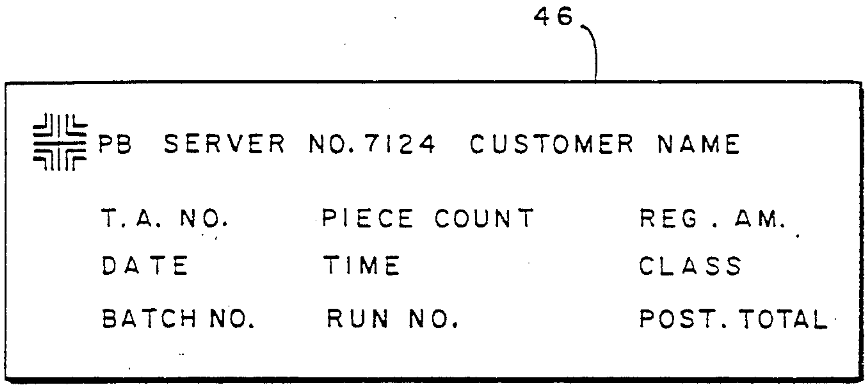
FIG. 2 is a plan view of an accounting statement that would accompany batch mail sent by the system of FIG. 1.

Referring now to FIG. 2, the passport 46 is shown after having printed thereon the total postage (Post. Total) required to mail the batch of mail, the transaction number(T.A. No.), piece count for a batch, descending register amount (Reg. Am.) after subtraction for the postage, the date, the time, the class, the batch number and the run number (optionally). Additionally, the server number, i.e., the identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein the server 25 is destroyed or the memory 26 therein is inadvertently erased, the user will still have a means for verifying the amount of postage value remaining from that amount of postage value originally purchased and stored. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM on an ongoing basis. By having the postage value contained within the memory 22 that corresponds to the value of the server 16, a check is constantly made to ensure that there is a correspondence between the passport 46 information and the amount of postage paid by the user. More specifically, the total amount credited to the user location 16 will be stored in memory 22 and if the amount in the ascending register exceeds that total amount available to the user, the user location 16 will be notified that there are insufficient funds. When a batch of mail is sent to a post office for processing, the passport 46 for that particular batch will accompany the mail. The postal employee can determine whether it is an authorized transmission of mail from the information contained upon the accompanying passport 46. If there is any question on the part of the postal service as to whether the information is authentic, it will contact the central station 14 and through the line 19 obtain the information from the central station to verify the information contained on the passport 46. If this information is accurate, then the postal service will know that the mail is authorized, i.e., the postage for the mail has been paid. On the other hand, if there is any discrepancy, the postal serve is able to act to ferret any fraud or correct any discrepancy. As is the usual practice in the user of postage meters, a user location 16 will send all its mail to an assigned post office.

Figure 3:
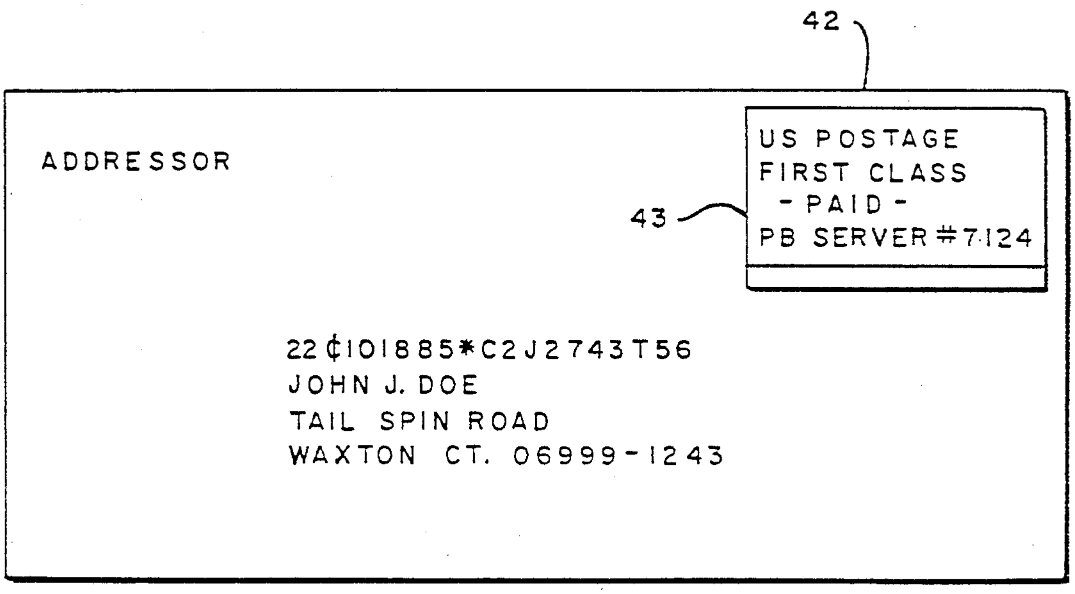
FIG. 3 is a plan view of an envelope containing information that would be applied thereto by the system of FIG. 1.
Figure 4:
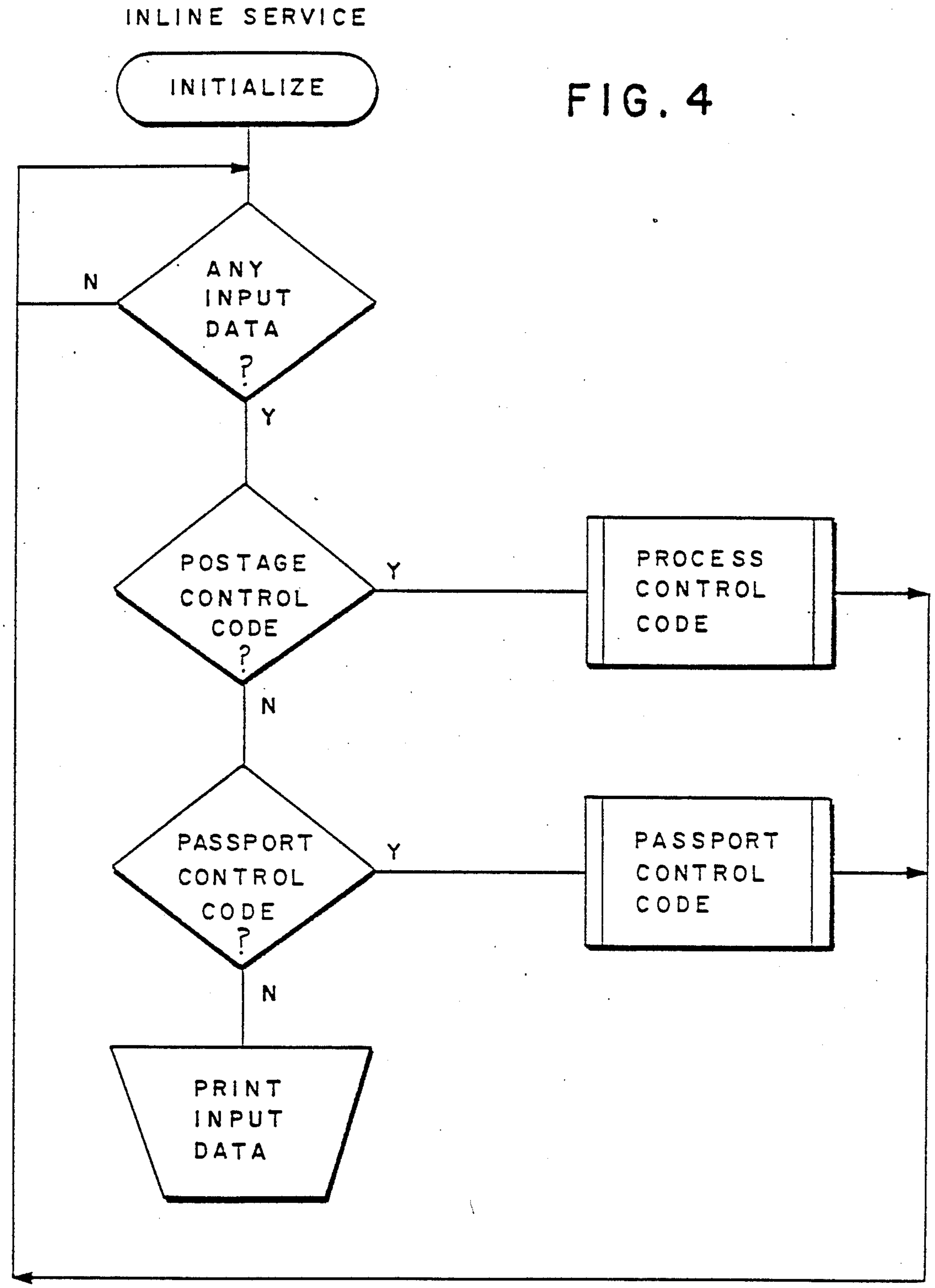
FIGS. 4–6 contain flow diagrams that describe the functions of the system shown in FIG. 1.
Figure 5:
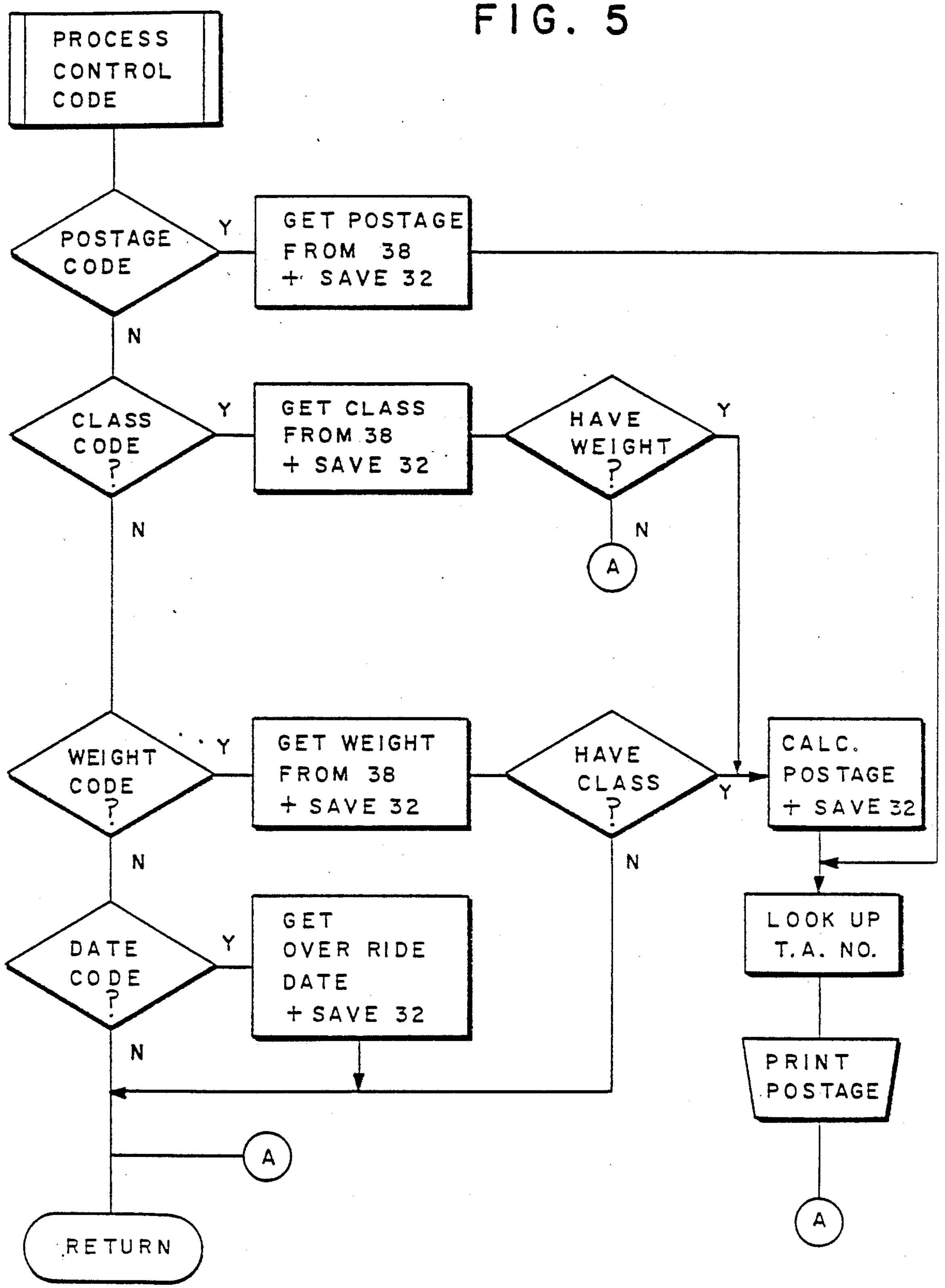
Figure 6:
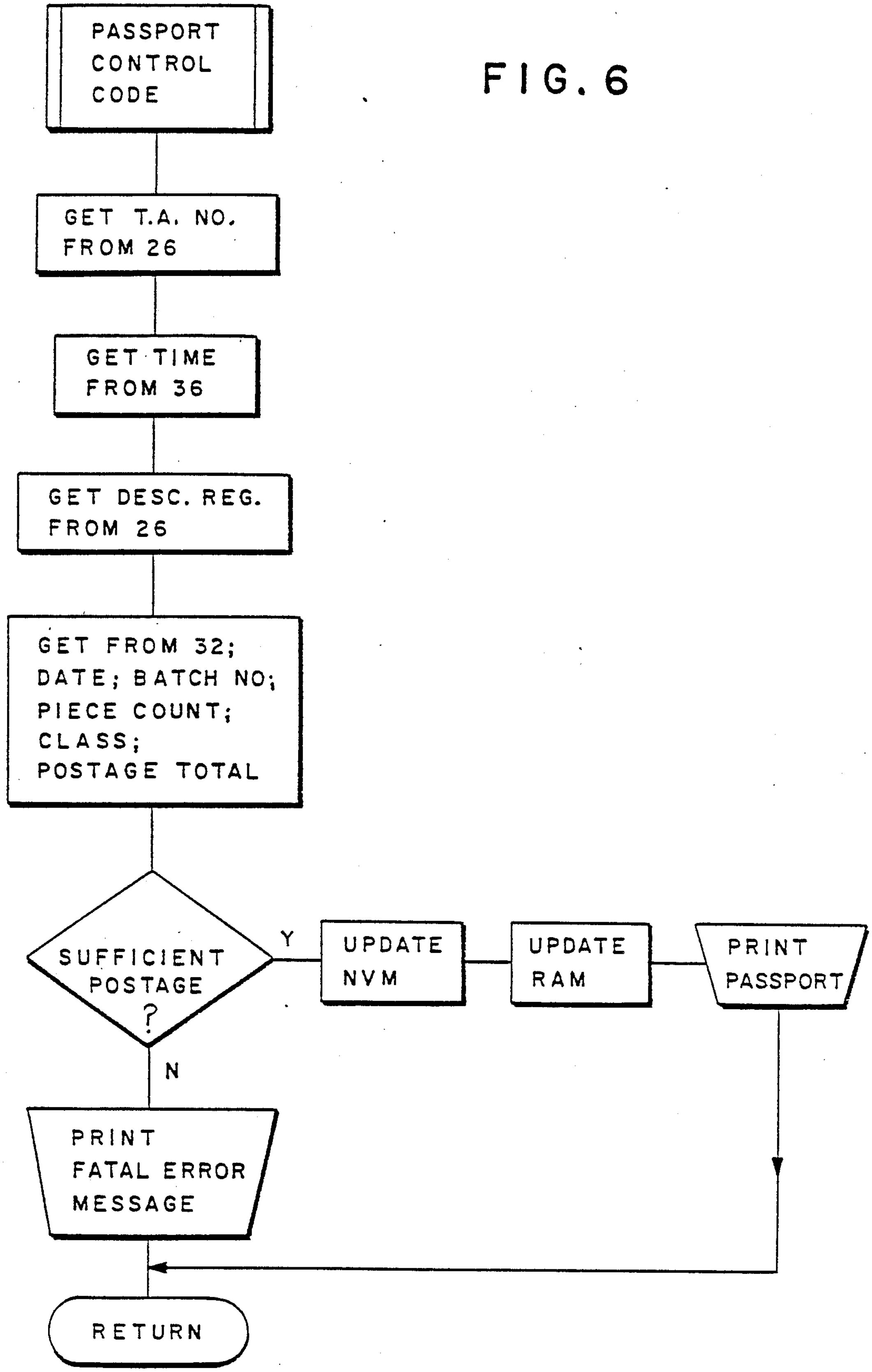

Referring now to FIG. 3, an envelope 42 is shown as it would be prepared by the present system 10. The upper left hand corner contains the address of the mail sender and the upper right hand corner contains a preprint block 43 containing the class of mail and gives the identification number or server number of the mail sender. This information may be preprinted on the envelopes 42 prior to processing of a batch. Such preprinting may be accomplished through direct communication of the input/processor 38 with the printer 44 without any participation of the other components of the user location 16.

In the processing of batch mail, the three address lines will first be printed in the address field with the name of the recipient, the street address and the city, state, zip code. The fourth line, or postage line is then printed using information supplied by the processor. This postage line, includes the postage amount $0.22, the date, Oct. 18, 1985 and the transaction number, which in this case is C2J2743T56. Other information may be given on this postage line is so desired including the time the mail is processed. Although the postage line is shown in alphanumerics it will be appreciated that the same maybe printed in bar code and, optionally, bar code address information may be printed on the envelope as desired. Additionally, the information in the pre-print block 43 may be printed in the address field with the other information therein and the preprint block may be eliminated.

Although an envelope 42 shown has the postage and address information printed on the face thereof the same scheme will apply to a windowed envelope. In a windowed envelope it may be preprinted as previously described but instead of the printer 40 printing on the face of the envelope 42, an insert would be printed with the same information shown on the face of the envelope 42 and inserted so as to be viewed from the window. Alternatively, the postage and address information may be printed upon a label and the label may be attached to the envelope 42.

Figure 7:
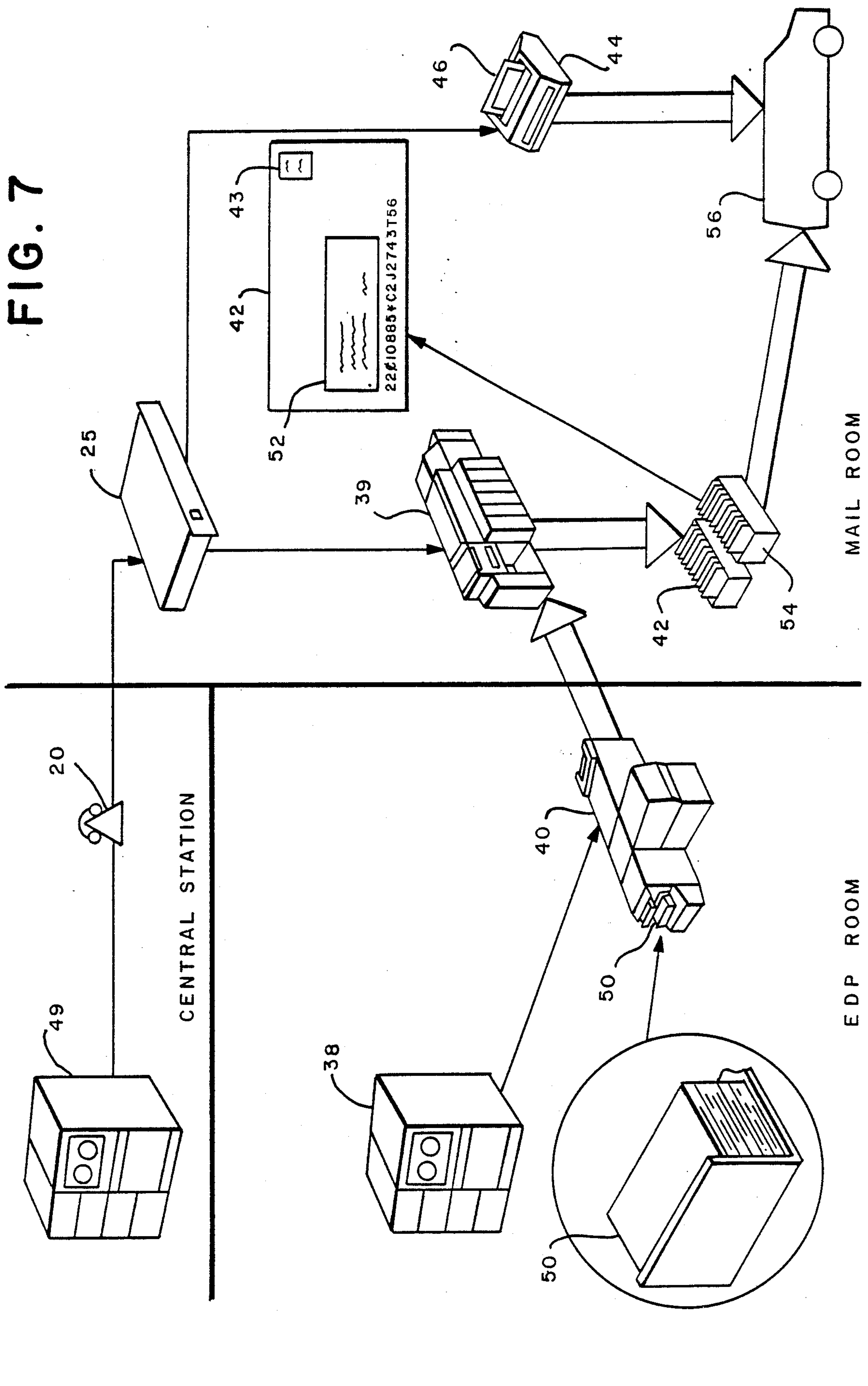
FIGS. 7 and 8 are block diagrams showing alternative methods of practicing the instant invention.
Figure 8:
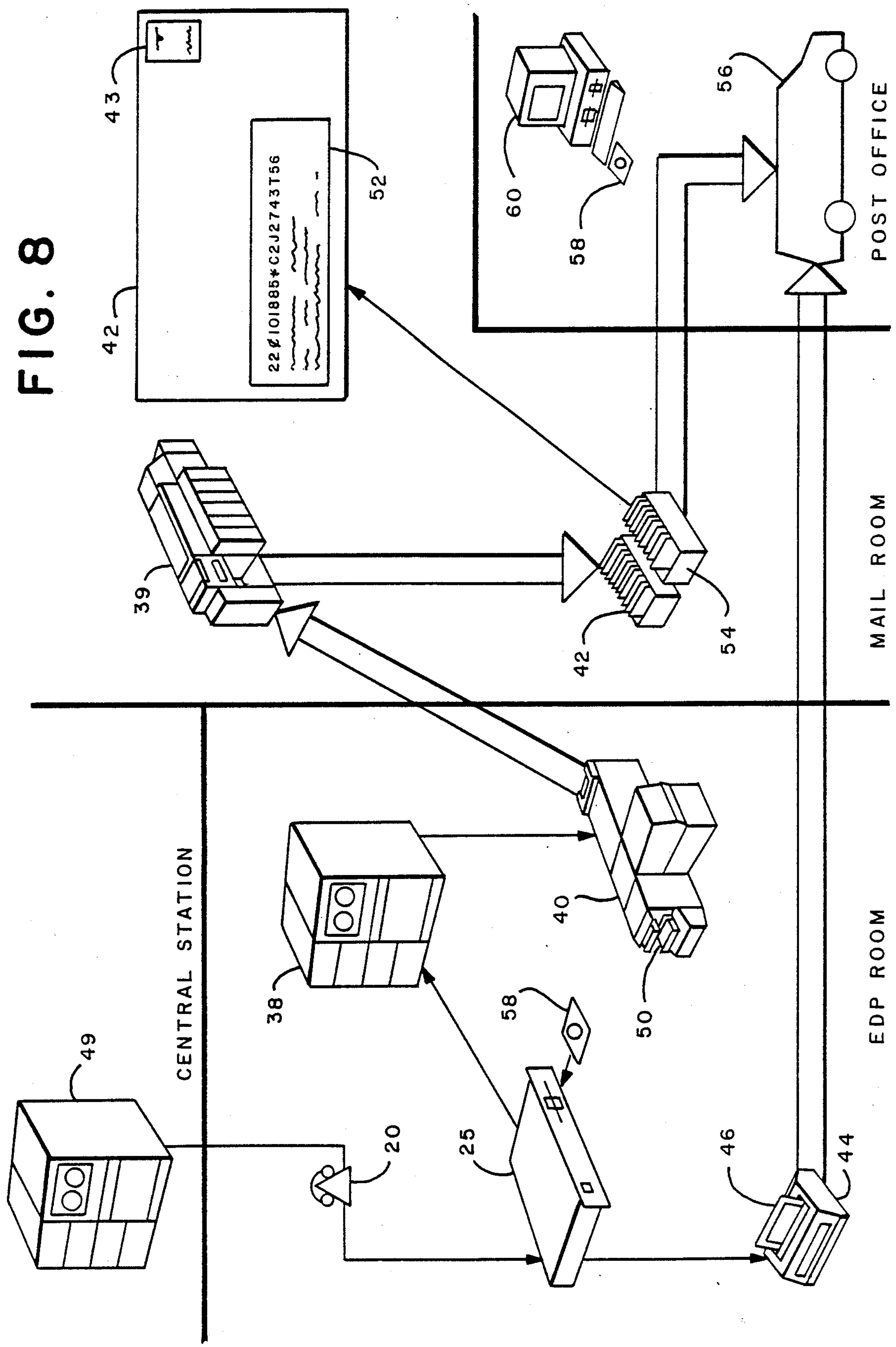

What has been shown and described up to now is a description of the preferred embodiment in terms of the basic components of the system. With reference to FIGS. 7 and 8 a more general description will be given of the invention as it may be carried out in a user location 16 in terms of the type of equipment that may be used. In FIGS. 7 and 8 like numbers are used to refer to like parts shown in FIGS. 1–6. Referring specifically to FIG. 7 the central station is shown as a computer 14 which will have the necessary memory, logic and postage value setting capability. As stated previously, this computer 14 will be one with large capacity capable of accommodating a large number of user locations 16 although only one of the latter will be described. The user location 16 is shown as being made up of a mailroom and an electronic data processing (EDP) room. Within the mailroom is an accounting unit 25 capable of storing data in memory and capable of performing logic functions. This accounting unit hereinafter will be referred to as a "server". The central station 14 is connected to the server 25 by a telephone 20. The server 25 in turn is in communication with an inserter 39 and a first printer 44. A computer 38 is provided within the EDP room of the user location 16.

This computer 30 may be any of a number of commercially available computers such as an IBM Model Series 370 available from IBM Corporation or a DEC Model VAX Series available from Digital Equipment Corp. This computer 38 would be capable of storing mail address that is to be printed on mail pieces. The term mail pieces includes the combination of inserts and envelopes where the mailing and postage data may be printed either on the insert or envelope in any combination. In addition, the computer 38 would be able to provide bar code information, sorting information and weight calculation data. All such information would be conveyed to a printer 40 that is capable of printing inserts 50 upon which the mail address information supplied by the computer 38 is printed. Subsequent to printing, each insert is conveyed to an inserter 39 and will serve as the first insert of a group of inserts, the address being positioned to be exposed within the window 52 of an envelope 42. The postage data will be printed on the envelope 52 in the form of a postage line that is the same as the postage line shown in FIG. 3, or the fourth line as stated previously. After the inserts 50 have been inserted into the envelopes 42 they are placed in trays 54 for subsequent shipping to the post office as by a vehicle 56.

The inserter 39 is in communication with the server 25 and is therefore capable of supplying information to the server 25 relative to mail pieces being sent and the postage value thereof. The inserter 39 may be provided with a bar code reader that reads the bar code placed upon the insert 50 by the user printer, the bar code indicating the mail data from which the amount of postage may be calculated by the server 25. Alternatively, the inserter 39 may have a scale capable of weighing mail pieces on the fly whereby postage for each mail piece may be calculated. Such scales are well known, see for example U.S. Pat. No. 4,185,709. The server 25 would then record data relative to the individual mail pieces and upon completion of a batch will enable the first printer 44 to print a passport 46. This passport, as described previously, is a statement sheet which shows the amount of mail sent and the postage charged for that batch of mail. Additionally, encryption may be included in that statement so that verification may be enhanced. Upon processing of the mail, the postage value stored in the descending register would be reduced by the amount of postage required to pay for the processed mail and this reduced value can be printed on the passport 46 along with the other information, i.e., transaction number, date, number of mail pieces, etc.

Referring now to FIG. 8, a further embodiment of the invention is shown wherein the central station 14 has a computer similar to that shown in FIG. 7. The computer 14 is connected to the server 25 by a phone link 20 and the server is directly connected to a user computer 38 and to a first printer 44. The server 25 is adapted to receive a recording medium such as a magnetic floppy disc 58. The computer 38 is in communication with a second printer 40 that prints both mail and postage data upon inserts. The computer 38 would be capable of weight calculations and sorting information to be provided to the printer 40 in addition to being capable of supplying mail address data. The printer 40 will print the mail and postage data upon the inserts 50 which are then supplied to the inserter 39 where such inserts 50 will serve as the first of a group of inserts in a windowed envelope 42. The printer 44 would print a summary sheet so that verification can be ascertained as previously described; however, in addition to the summary sheet 46, the floppy disc 58 would record all transactions. With such floppy disc 58, not only is one able to take a statement sheet to the post office to verify authenticity of the mail, but one is also able to provide a floppy disc that will give a history of the mailing transactions of the user. Such floppy disc 58 would be received by the postal service and placed in a personal computer 60 to obtain the information therefrom. At this junction the postal service could communicate with the central station to ensure that mail that had been sent over a given period was authentic, i.e., that the mail had been paid for. Obviously, the floppy disc may serve the function of a "passport" thereby allowing removal of one of the printers 44, if desired.

Although the mailing systems described in conjunction with FIGS. 7 and 8 include inserts 50 that are inserted into envelopes 42, it will be appreciated that the user printer 40 may print directly upon non-windowed envelopes 42 and inserts 50 placed therein without departing from the invention. More specifically, the form of mail pieces processed is not critical to the invention.

In this way what is provided is a method of allowing a organization to send large amounts of mail without having to frank every piece. In addition, the postal service is saved the problem of, requiring on-site inspections at the user location 16 in order to verify that no unauthorized mail is being sent. By correlating the amount of postage, the transaction number, piece count, registration amount and the like, verification can be made without the need of encryption. The central station 14 more or less acts as a bank representing the postal service and handles the funds on its behalf as well as maintains records for verification. The funds or postage value charged to the server 25 may be either prepaid or charged to the user by the central station 14 on a credit arrangement. The central station 14 would be accountable to the postal service for the postage value placed in the server 25 on a immediate basis. The central station 14 may be a postage meter or server 25 manufacturer or any other reliable entity.

Another advantage of this system is that the printer 40 that prints the large numbers of mail pieces is not part of a secure member, i.e., the server 25, as in the case of a postage meter. Because of this, the printer 40 may be replaced frequently without the expense or inconvenience of entire replacement. It will be appreciated that one printer 40 may be used in place of the two printers 40, 44 shown and described, but the preferred embodiment contemplates the use of two printers for the reasons given.

What is claimed is:

1. A system for processing a batch of mail pieces wherein at least some said mail pieces are comprised of a combination of an envelopes and an insert; said system comprising:

means for accounting;

first means, in communication with said accounting means, for printing postage data on a statement sheet to print a verifiable statement on said statement to enable verification of payment of postage for said batch of mail pieces;

means for generating mail data;

second means for printing, in communication with said mail data generating means and said accounting means, for printing postage data and said mail data upon each mail piece of said batch of mail pieces; and means for inserting an insert into at least one of said envelopes, said inserting means being in communication with said accounting means.

2. The system of claim 1 wherein said second printing means includes a first printer for printing mail data on said insert and a second printer for printing postage data upon said envelope.

3. The system of claim 1 wherein said accounting unit includes a descending register for storing postage value.

4. The system of claim 1 wherein said accounting unit contains a memory having an identification number stored therein.

5. The system of claim 1 further including means, in communication with said accounting unit, for adjusting the postage value amount in said descending register.

6. The system of claim 1 wherein said first printer is a secure printer and said second printer is a high speed printer.

7. The system of claim 6 wherein said first printer is a dot matrix printer.

8. The system of claim 1 wherein said accounting unit is operable to receive a recording medium and write postage data thereon.

9. A system for processing a batch of mail pieces, wherein at least some of said mail pieces are comprised of a combination of an envelope and an insert, comprising;

a central station operative to dispense and receive postage data;

a user location having means for accoutring in communication with said central station;

first means for printing a verifiable statement on a statement sheet to enable verification of payment of postage for said batch of mail pieces, said first printing means being in communication with said accounting means;

a processor operative to generate mail data;

a second means for printing, said second printing means being in communication with said processor and said accounting means for printing mail and postage data;

means for supplying a plurality of inserts to said second printing means; and means for inserting said inserts into an envelope, said inserting means being in communication with said accounting means such that data relative to said inserts being processed may be supplied to said accounting means and to said central station.

10. The system of claim 9 wherein said accounting unit includes a descending register for storing postage value.

11. The system of claim 10 wherein said accounting unit includes a memory having an identification number stored therein.

12. The system of claim 10 wherein said central station includes means for resetting the postage value of aid descending register in said accounting unit.

13. The system of claim 9 wherein said second printing means includes a first printer in communication with said processor for printing mail data on one of said inserts and a second printer in communication with said accounting means for printing postage data on said envelope.

14. The system of claim 13 wherein said second printer is incorporated into said inserting means.

15. The system of claim 13 wherein said first printer is a secure printer and said second printer is a high speed printer.

16. The system of claim 15 wherein said first printer is a dot matrix printer.

17. A method of processing mail, the steps comprising:

storing postage value in an accounting means;

generating mail and postage data;

printing said mail and postage data on mail pieces;

calculating the value of postage required for mailing said mail pieces;

printing the calculate value on a statement sheet; and subtracting the printed value from the postage value stored in said accounting means;

18. The method of claim 17 wherein the printing of the mail postage data includes the steps of printing mail data on an insert, printing postage data on an envelope and inserting said insert into said envelope.

19. A system for processing batch mail with a verifiable statement of postage and mail information relating to the batch; said system comprising:

an accounting means operative to receive and write information upon a recording medium;

first means for printing, said first printing means being in communication with said accounting means for printing information relating to said batch on a statement;

means for generating mail data, said means being in communication with said accounting means; and second means for printing, said second printing means being in communication with said mail data generating means for printing mail and postage data on individual pieces of said batch.

20. The system of claim 19 further comprising a central station for receiving postage and mail information, said central station being in communication with said accounting unit.

21. The system of claim 20 wherein said recording medium is a magnetic floppy disc.

22. A system for processing a batch of mail pieces, wherein at least some of said mail pieces is comprised of a combination of an envelope and an insert, comprising:

a central station;

a user location having an accounting means in communication with said central station, said accounting means begin operative to receive and write information upon a recording medium;

a first printer for printing postage information upon a statement sheet in communication with said accounting means to provide a verifiable statement on said statement sheet to enable verification of payment of postage for said batch of mail pieces;

a processor in communication with said accounting means for generating mail information;

a second printer in communication with said processor and operative to receive mail information therefrom;

means for supplying inserts to said second printer; and means for inserting said inserts into said envelope;

23. The system of claim 22 wherein said recording medium is a magnetic floppy disc.

24. A system for processing a batch mail with a verifiable statement of postage and mail information relating to the batch of mail comprising;

accounting means operative to receive and output postage and mailing information relative to said batch of mail.

a first printing means in communication with said accounting means for printing said postage and mailing information relating to said batch of mail;

a mail information generating means in communication with said accounting means;

a postage information generating means in communication with said accounting means; and a second printing means in communication with said mail information generating means and said postage information generating means for printing mail and postage information on individual pieces of said batch of mail.

25. The system of claim 24 further comprising a central station for receiving postage and mail information, said central station being in communication with said accounting means.

* * * * *